P. WERDER.
FREEZING MACHINE FOR FOODSTUFFS AND BEVERAGES.
APPLICATION FILED OCT. 10, 1919. RENEWED MAY 13, 1922.
1,434,174.
Patented Oct. 31, 1922.
2 SHEETS—SHEET 1.
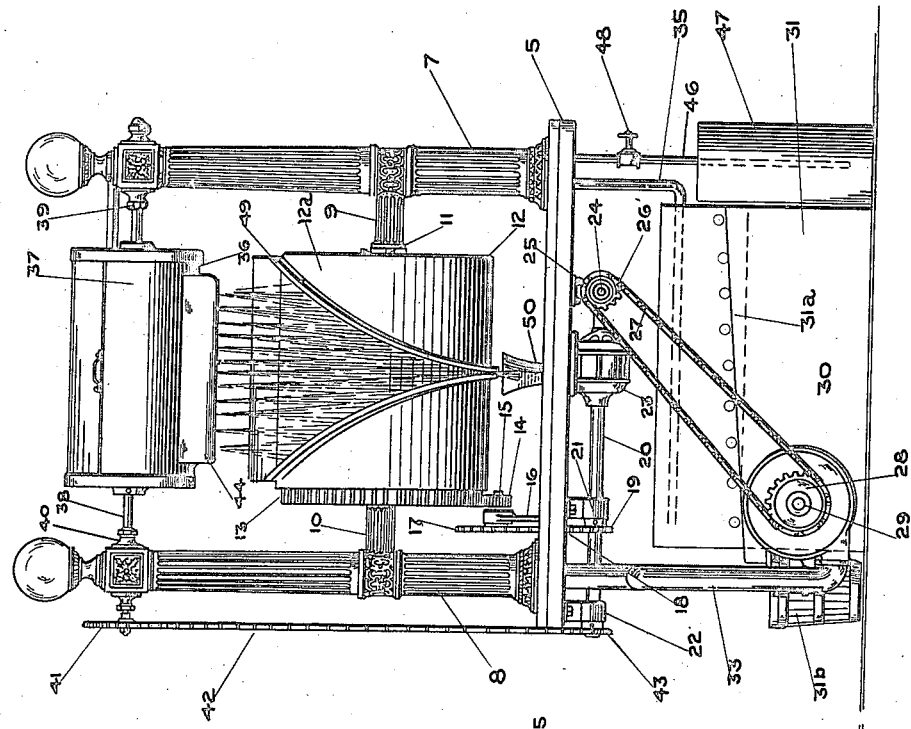
INVENTOR.
PAUL WERDER
BY Joseph J. O'Brien
ATTORNEY.

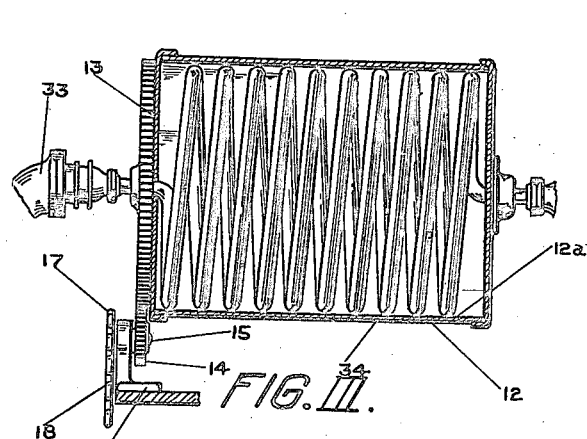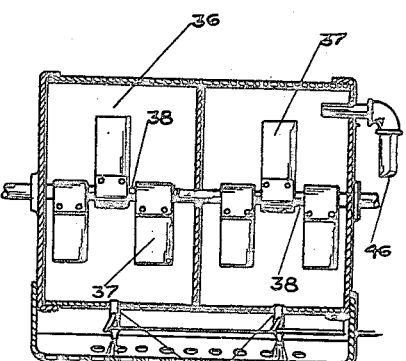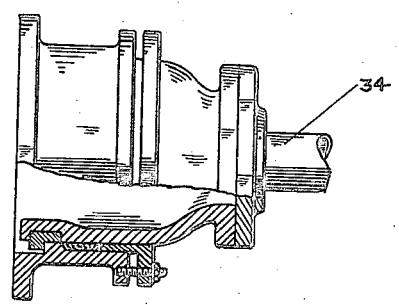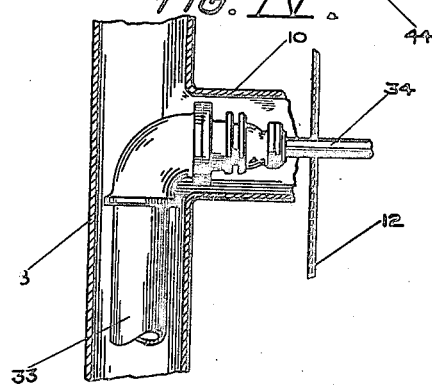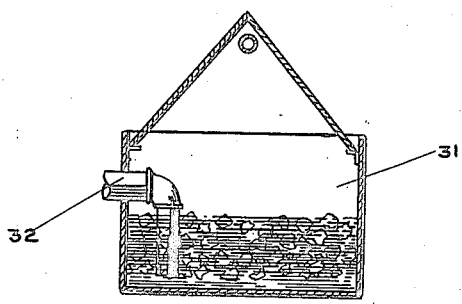

Patented Oct. 31, 1922.

1,434,174

UNITED STATES PATENT OFFICE.

PAUL WERDER, OF SPRINGFIELD, MASSACHUSETTS, ASSIGNOR, BY DIRECT AND MESNE ASSIGNMENTS, TO THE INSTANT FREEZER COMPANY, OF SPRINGFIELD, MASSACHUSETTS, A CORPORATION OF MASSACHUSETTS.

FREEZING MACHINE FOR FOODSTUFFS AND BEVERAGES.

Application filed October 10, 1919, Serial No. 329,868. Renewed May 13, 1922. Serial No. 560,714.

*To all whom it may concern:*

Be it known that PAUL WERDER, a citizen of the United States of America, residing at Springfield, in the county of Hampden and State of Massachusetts, has invented certain new and useful Improvements in Freezing Machines for Foodstuffs and Beverages, of which the following is a specification.

This invention relates to improvements in machines for freezing food stuffs and beverages, such as fruit juices, ice cream and similar dishes or drinks and its leading object is to provide a machine with a continuous freezing action applied by means of a rotary temperature reducer, arranged to work under a dispensing or distributing device, and provided with a collector whereby the cooled or frozen food stuffs or fruit juices may be directed into a glass or receptacle.

Another object of the invention is to provide a machine of this character with a simple circulating freezing or temperature reducing apparatus capable of maintaining a low temperature at the surface of a rotary cylinder, through which the cooling medium is arranged to circulate.

Another object of the invention is to provide a machine of this character with improved means for distributing the fruit juices or food stuffs in liquid form or in a fluent condition over the surface of the rotary cooling cylinder.

With the above and other objects in view this invention relates to certain new and useful improvements, constructions and arrangements of parts, clearly described in the following specification and fully illustrated in the accompanying drawings, in which:

Fig. 1 is a front elevation of my improved device.

Fig. 2 is an end elevation thereof, certain portions being omitted to show the working parts more clearly.

Fig. 3 is a detail sectional view on an enlarged scale showing the cooling coil of the rotary drum.

Figure 4 is a detail vertical sectional view through the agitator and distributer for the food substances.

Figure 5 is a detail side elevation partly in section showing the rotary coupling.

Figure 6 is a vertical sectional view through one of the columns showing the coupling in side elevation.

Figure 7 is a detail vertical sectional view on a reduced scale showing the brine tank.

Referring to the accompanying drawings 5 designates a table supported upon standards or legs 6. On this table the tubular standards 7 and 8 are mounted. The standard 7 is equipped with an L or branch member 9 of tubular construction and the standard 8 is equipped with a similar member 10, said members being axially aligned. A hollow shaft 11 is journaled in the members 9 and 10 and on this shaft a rotary cooling drum or cylinder 12 is mounted. The drum 12 is equipped on one end with a relatively large gear 13 which is in driving engagement with the pinion gear 14 mounted upon a shaft 15 journaled upon the bracket 16. The shaft 15 carries a sprocket 17 which is engaged by a sprocket chain 18 driven through a gear 19 carried by the motor shaft 20, which is supported in bearings 21 and 22 mounted on the under side of the table 5. The motor shaft 20 is rotated by means of an electric motor or similar device 23 suspended under the table 5 or otherwise suitably supported.

The motor shaft 20 is extended at one end and has driving engagement with a shaft 24 mounted upon a bracket 25 and the shaft 24 carries a sprocket gear 26 which has driving engagement with the sprocket chain 27, which is trained over the sprocket gear 28 mounted upon the shaft 29, supported upon the side wall 30 of the cooling fluid tank 31. The shaft 29 extends outwardly of a pump casing 32 and is equipped with an impeller adapted to force cooling fluid from the tank 31 upwardly through the delivery pipe 33, the upper end of which is extended through the tubular standard 8 and has delivery connections with the intake end 34 of the cooling pipe which is helically disposed in contacting engagement with the inner surface of the cylinder wall 12$^a$ of the cylinder 12. The other end of the pipe has discharge connection with the discharge or waste pipe 35 which extends downwardly through the tubular standard 7 and into the upper part of the tank 31.

The lower end of the discharge pipe 35 is provided with a plurality of outlets or openings so that the cooling fluid may be discharged more or less uniformly over the entire tank 31, in which a mixture of brine and ice or any other equivalent mixture is arranged. The connection between the delivery pipe 33 and the cooling pipe 34, and the cooling pipe 34 and the waste pipe 35 is such as to permit the cylinder 12 to freely rotate under the power transmitted from the motor 23 to the gear 13. The cooling apparatus described is designed to provide a continuous circulation of freezing or cooling fluid through the drum or cylinder 12 so that the outer surface of this drum or cylinder will be maintained at a uniform low temperature.

The fruit juices or mixture for ice cream, sherbet, ices or other fruit dishes or beverages is sprayed over the top portion of the cylinder 12 by means of a dispensing tank 36 in which a rotary agitator 37 is arranged to work on the shaft 38 which is supported in bearings 39 and 40. The shaft 38 is driven by means of sprocket gear 41 engaged by a sprocket chain 42 which works over a sprocket gear 43 on the end of the motor shaft 20. The mixture contained in the tank 36 is distributed on the drum through a perforated base 44, said tank being equipped with one or more partitions and selective valves 45 whereby various fluids or preparations may be distributed on the drum. The supply is fed to the tank 36 by means of a feed pipe 46, which is charged by means of a pressure tank 47 and which is equipped with a valve 48 for controlling the flow therethrough. The mixture or preparation is forced through the pipe 46 which extends upwardly through the standard 7 and into the tank 36.

In order to concentrate the flow of the chilled or cooled fruit juices or other substances a collector shown to consist of a V shaped scraper member 49 is arranged in contacting relation with the front face of the drum 12 so as to guide the chilled substances or materials to a drinking glass or receptacle 50 disposed at the apex or discharge end of the collector. Instead of using a single collector I may employ a plurality of collectors so that each fluid or mixture will have its own individual course or path over the drum 12.

It is desirable that a constant level be maintained in the cooling fluid tank 31 and for this purpose an overflow trough 31ª is provided which is adapted to discharge the over flow into a hopper or receptacle 31ᵇ arranged at the outlet end thereof.

The entire mechanism is preferably enclosed in a glass case so as to be protected against dust and to prevent atmospheric heat from consuming the ice employed, for the reduction of temperature too rapidly.

By means of my invention fruit juices and food and drink or beverage mixtures may be quickly chilled or frozen by being flowed in a thin film over the surface of the rotating drum in a few seconds after the material is deposited on the drum from the dispensing device.

Having described my invention, I claim:

1. A machine, for cooling fluid substances, consisting of a rotary drum, means for circulating a cooling medium through the drum while the same is maintained in rotation, such means consisting in part of a coil of pipe the convolutions of which are adjacent to the inner periphery of said drum, and means for directing the substance or substances to be cooled on to the drum, whereby said substance or substances will flow in a thin film over the drum.

2. A device for cooling food substances consisting of a rotary drum having means for maintaining its surface at a low temperature and adapted to freeze the food substances when said substances are caused to flow aginst the drum while same is in rotation, and a wiping collector arranged in contacting relation to the drum to concentrate the frozen substances at one discharge point.

3. A device, for cooling food substances, consisting of a rotary drum having means for maintaining its surface at a low temperature and adapted to cool the food substances when said substances are caused to flow against the drum while same is in rotation, and a collector for directing the cool substances to a receptacle, said collector having downwardly converging wiper members adapted to separate the chilled substances from the drum.

4. A machine, for cooling food substances, consisting of a rotary drum having a spiral cooling conduit arranged therein, means for rotating the drum, and means for maintaining a constant circulation of cooling fluid through the conduit of the drum to maintain its external surface at a low temperature.

5. A machine, for cooling food substances, consisting of a rotary drum having a cooling conduit arranged therein, means for rotating the drum, means for maintaining a constant circulation of cooling fluid through the conduit of the drum to maintain its external surface at a low temperature, and means for spraying the food substances to be cooled on top of the drum.

6. A machine, for cooling food substances, consisting of a rotary drum having a cooling conduit arranged therein, means for rotating the drum, means for maintaining a constant circulation of cooling fluid through the conduit of the drum to maintain its external surface at a low temperature, means for spraying the food substances to be cooled on top of the drum, and a collector arranged in operative relation to the drum to concentrate the chilled food substances at the discharge point.

7. In a food and beverage freezing machine, supports, a drum, means for supporting said drum on the supports for rotation, a helically disposed conduit in the drum, a refrigerant source, a circulator having communication with said refrigerant source, means forming communication between the conduit and said circulator and adapted to permit of the rotation of the conduit, and means forming communication between the conduit and said refrigerant source to return the waste from said source to the same.

8. In a food and beverage freezing machine, supports, a drum, means for supporting said drum on the supports for rotation, a helically disposed conduit in the drum, a refrigerant source, a circulator having communication with said refrigerant source, means forming communication between the conduit and said circulator and adapted to permit of the rotation of the conduit, means forming communication between the conduit and the refrigerant source to return the waste from said source to the same, a liquid distributor arranged above the drum, an agitator therein, means for operating said agitator, and a collector arranged in operative relation to the drum and adapted to concentrate the congealed substance at the point of discharge.

Signed by me at Springfield, Mass.

PAUL WERDER.